United States Patent
McVay (10) Patent No.: US 12,197,349 B2
(45) Date of Patent: Jan. 14, 2025

(54) COMMAND PACKETS FOR THE DIRECT CONTROL OF NON-VOLATILE MEMORY CHANNELS WITHIN A SOLID STATE DRIVE

(71) Applicant: MICRON TECHNOLOGY, INC., Boise, ID (US)

(72) Inventor: Jeffrey McVay, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/452,120

(22) Filed: Oct. 25, 2021

(65) Prior Publication Data
US 2022/0043761 A1 Feb. 10, 2022

Related U.S. Application Data

(63) Continuation of application No. 16/508,155, filed on Jul. 10, 2019, now Pat. No. 11,169,939, which is a (Continued)

(51) Int. Cl.
*G06F 13/16* (2006.01)
*G06F 3/06* (2006.01)
(Continued)

(52) U.S. Cl.
CPC ........ *G06F 13/1668* (2013.01); *G06F 3/0613* (2013.01); *G06F 3/0659* (2013.01);
(Continued)

(58) Field of Classification Search
CPC ....... G06F 3/0607; G06F 3/0655–0679; G06F 13/387; G06F 13/1668–1694; G06F 13/42–4282
(Continued)

(56) References Cited

U.S. PATENT DOCUMENTS

| 10,467,155 B2 | 11/2019 | Mcvay |
| 2008/0016269 A1 | 1/2008 | Chow et al. |

(Continued)

OTHER PUBLICATIONS

U.S. Appl. No. 16/508,155 titled "Command Packets for the Direct Control of Non-Volatile Memory Channels Within a Solid State Drive" filed Jul. 10, 2019, pp. all pages of the application as filed.

*Primary Examiner* — Ilwoo Park
(74) *Attorney, Agent, or Firm* — Dorsey & Whitney LLP (57) ABSTRACT

Apparatuses and methods for providing and interpreting command packets for direct control of memory channels are disclosed herein. An example apparatus includes flash memories configured into channels and a controller coupled to the flash memories. The controller receives packets and interpret the packets based at least on a first protocol, and determines whether any packets are linked based on a link identifier included in a block of each packet. The controller arranges the subset of packets based on an index included in the block of each packet of the subset of packets, and the subset of packets are arranged in order based on the respective indexes. A target flash memory and a target channel are determined by the controller based on flash memory and channel identifiers included in the block of each of the packet of the subset of packets.

20 Claims, 6 Drawing Sheets

Related U.S. Application Data continuation of application No. 14/923,269, filed on Oct. 26, 2015, now Pat. No. 10,467,155.

(51) Int. Cl.
 *G06F 13/40* (2006.01)
 *G06F 13/42* (2006.01)
(52) U.S. Cl.
 CPC ........ *G06F 3/0679* (2013.01); *G06F 13/4068* (2013.01); *G06F 13/4282* (2013.01)
(58) Field of Classification Search
 USPC ...................... 710/5–7, 33, 74, 105; 711/103
 See application file for complete search history.

(56) References Cited

U.S. PATENT DOCUMENTS

| | | | |
|---|---|---|---|
| 2008/0320155 A1* | 12/2008 | Ganapathy | G06F 16/183 709/230 |
| 2010/0262738 A1* | 10/2010 | Swing | G06F 3/0619 711/E12.001 |
| 2010/0262740 A1 | 10/2010 | Borchers et al. | |
| 2013/0067137 A1 | 3/2013 | Molloy | |
| 2013/0135007 A1 | 5/2013 | Surico et al. | |
| 2014/0108714 A1 | 4/2014 | Lee et al. | |
| 2014/0229659 A1* | 8/2014 | Jones | G06F 3/0659 711/103 |
| 2014/0281040 A1 | 9/2014 | Liu | |
| 2014/0281151 A1 | 9/2014 | Yu | |
| 2014/0372666 A1* | 12/2014 | Moioli | G11C 7/1045 711/103 |
| 2015/0169245 A1 | 6/2015 | Lassa | |
| 2015/0261446 A1* | 9/2015 | Lee | G06F 13/385 711/105 |
| 2016/0162202 A1* | 6/2016 | Singhai | G06F 3/061 711/103 |
| 2016/0162416 A1* | 6/2016 | Boyd | G06F 12/0246 711/202 |
| 2016/0357698 A1 | 12/2016 | Huang | |
| 2017/0116139 A1 | 4/2017 | Mcvay | |
| 2017/0160929 A1 | 6/2017 | Ayandeh | |
| 2019/0332555 A1 | 10/2019 | Mcvay | |

\* cited by examiner

| Name | Description |
|---|---|
| CCID | Chained Command Identifier may be used to identify commands in a chain. |
| CCIDX | Chained Command Index may be a monotonically incrementing value used to sequence commands in a chain. |
| CHAN | Channel may identify the target channel for the command chain. |
| CE | Chip Enable may identify the target memory for the command chain. |
| DQn | DQn may be operands 0 through 8 of a command packet. |
| CTRL X | Control X may define the DQn operand types included in the DWords. Each control field may correspond to a DQ field in the same DWord. For example, CTRL 0 applies to the DQ in Byte 0, CTRL 1 applies to the DQ in Byte 1, and CTRL 2 applies to the DQ in Byte 2. <table><tr><th>CTRL X Bit</th><th>Description</th></tr><tr><td>7:6</td><td>Rsvd</td></tr><tr><td>5:4</td><td>Ctrl 2</td></tr><tr><td>3:2</td><td>Ctrl 1</td></tr><tr><td>0:1</td><td>Ctrl 0</td></tr></table> <table><tr><th>CTRL X Bit Value</th><th>Description</th></tr><tr><td>00b</td><td>Non-ONFI Command</td></tr><tr><td>01b</td><td>ONFI Command Cycle</td></tr><tr><td>10b</td><td>ONFI Address Cycle</td></tr><tr><td>11b</td><td>ONFI Data</td></tr></table> |

Table 2

Fig. 5

COMMAND PACKETS FOR THE DIRECT CONTROL OF NON-VOLATILE MEMORY CHANNELS WITHIN A SOLID STATE DRIVE

CROSS-REFERENCE TO RELATED APPLICATION

This application is a continuation of U.S. patent application Ser. No. 16/508,155 filed Jul. 10, 2019 and issued as U.S. Pat. No. 11,169,939 on Nov. 9, 2021, which is a continuation of U.S. patent application Ser. No. 14/923,269, filed Oct. 26, 2015 and issued as U.S. Pat. No. 10,467,155 on Nov. 5, 2019. The aforementioned applications, and issued patents, are incorporated by reference herein in its their entirety and for all purposes.

BACKGROUND

Computing environments have included and relied on storage devices to store programs and data. The storage devices have evolved over the years from tape and reel, to magnetic disk drives, to solid state storage units. With each evolutionary step, protocols and interfaces have conventionally either been adapted from the previous type or developed a new. Additionally, at each evolutionary step, the level of control a host system has over the storage device has varied, typically influenced by such considerations as storage complexity, storage amount, and the sophistication of the user. The latest evolutionary step has included the development and adoption of solid state devices to replace magnetic disk drives, in particular, the adoption of Solid State Drives (SSDs). The initial adoption of the solid state devices included the use of conventional interface protocols used for magnetic disk drives, but the protocols may not allow some users the flexibility and control they may desire to have over the solid state devices.

SSDs conventionally communicate with a host controller using various interface protocols, such as ATA, SATA, PCIe, etc. Each of these interface protocols may have their own associated communication structures, e.g., packet structures, which may also include different command types and user-available packet sections included in each packet. Other distinguishing features of the various protocols may include packet transfer rates, timing, various types of control, and etc. As such, each interface protocol may provide flexibility in ways the other interface protocols do not. Accordingly, there may be tradeoffs to consider when determining which interface protocol to choose for an SSD.

DETAILED DESCRIPTION

Apparatuses and methods for low level flash memory control via an Non-Volatile Memory Express (NVMe) submission queue entry are disclosed herein. Certain details are set forth below to provide a sufficient understanding of embodiments of the disclosure. However, it will be clear to one skilled in the art that embodiments of the disclosure may be practiced without various of these particular details. In some instances, well-known device components, circuits, control signals, timing protocols, and software operations have not been shown in detail in order to avoid unnecessarily obscuring the described embodiments of the disclosure.

The various SSD interface protocols provide different levels of control to a host. The interface protocols may define packet structures for providing commands, addresses, and data from the host to the SSD. For example, the Non-Volatile Memory Express (NVMe) protocol defines a 64 byte Submission Queue Entry (SQE), which may also be referred to as an NVMe packet structure, for providing command, address, and data from a host to an SSD. Per the protocol, the 64 bytes of the SQE are divided into 16 DWords (each DWord includes 4 bytes) with a subset of the DWords protocol-defined and the remaining DWords available for the user. For example, twelve of the DWords (0-11, specifically) are pre-defined by the protocol, while the remaining four DWords (12-15, specifically) may be user defined for providing data and/or memory address information. In the NVMe protocol the address information may be purely logical address information. A host system may develop a submission queue that includes SQEs to be submitted to an SSD, with the content of the SQEs defined by one or more processing cores of the host system.

The various standards used to interface with SSDs may also be dependent upon the type of bus architecture coupling the SSD to the host system. For example, an SSD coupled to a host system by a Peripheral Component Interconnect Express (PCIe) bus may use the NVMe protocol. The combination of the NVMe protocol and the PCIe bus may provide, in some embodiments, a high bandwidth interface between the host system and the SSD.

Additionally, different flash memory protocols may be used within an SSD to interface with the flash memories included therein. One flash-specific protocol may be the Open NAND Flash Interface (ONFI) protocol. The ONFI protocol may define flash-specific interface standards that may govern how a flash interface included in an SSD interfaces with the flash memories. For example, the ONFI standard may define various commands, timing sequences, and pin layouts for flash devices, among other things. As such, in some embodiments there may be two protocols governing the interface operations with an SSD in a PCIe environment, such as NVMe and ONFI.

While these two protocols may allow different levels of control at the flash memory level of the SSD, the protocol allowing the least amount of control may limit a host's ability to manipulate the SSD as desired. For example, the limitations of the NVMe protocol may limit the flexibility of the host in manipulating individual NAND flash devices within an SSD and/or specific channels of the SSD. Additionally, NVMe may limit the commands that may be requested by the host system. For example, each SQE may be self-contained, and, as a result, each SQE may be executed without regards to other SQEs received by an SSD. Further, the completion of each SQE may conclude with an associated notification flag provided to the host system by the SSD, or read data. As such, the NVMe protocol may not allow SQEs to be linked or related to one another from at least the vantage point of the SSD. The lack of linking may be due to the fact that the PCIe standard may provide SQEs to the SSD in an order different than they were placed in the submission queue. If SQEs that are intended to be performed in a desired order are received out of order, the SSD would not know to manipulate the order of performing the SQEs under the NVMe protocol.

While NVMe may have a limited number of available commands, ONFI may provide a greater number of commands. With a greater number of commands, ONFI may provide more flexibility than NVMe. As a result, the flexibility of ONFI may not be truly utilized when used in conjunction with NVMe since the host has limited control in its interaction with the SSD through the NVMe protocol. For example, NVMe may only allow commands (e.g., read, write, program) to be performed at a logical address, over which the host may not have control. However, instead of being limited to the logical address space, the host may desire controlling individual flash memories down to the physical address space, e.g., pages, planes, specific columns and rows, channels, etc. Additionally, the host may desire to control wait times, delay times, and data protection at the flash level, which NVMe may not allow. ONFI, however, may allow control at such levels of granularity. Therefore, there may be a desire to access ONFI commands, and additionally user defined non-ONFI commands, using the NVMe packet structure and a further need for linking related SQEs.

In some embodiments of the disclosure, user available DWords of the SQE. e.g., the NVMe-based packet structure, may be utilized to link a number of SQEs to define a single command or a sequence of commands, and to further provide ONFI commands and physical address information so the command may be performed on specific flash devices of specific channels and/or at specific physical addresses within the specific flash devices. Additionally, user-defined commands (e.g., non-ONFI commands) may be included in the user available DWords, which may provide the host with even more flexibility and control than the host may otherwise have. The command packets may be linked and numbered through identifiers included in the user available DWords, which may allow the SSD to reorder the NVMe-based packets when received out of order.

Figures 1, 2:
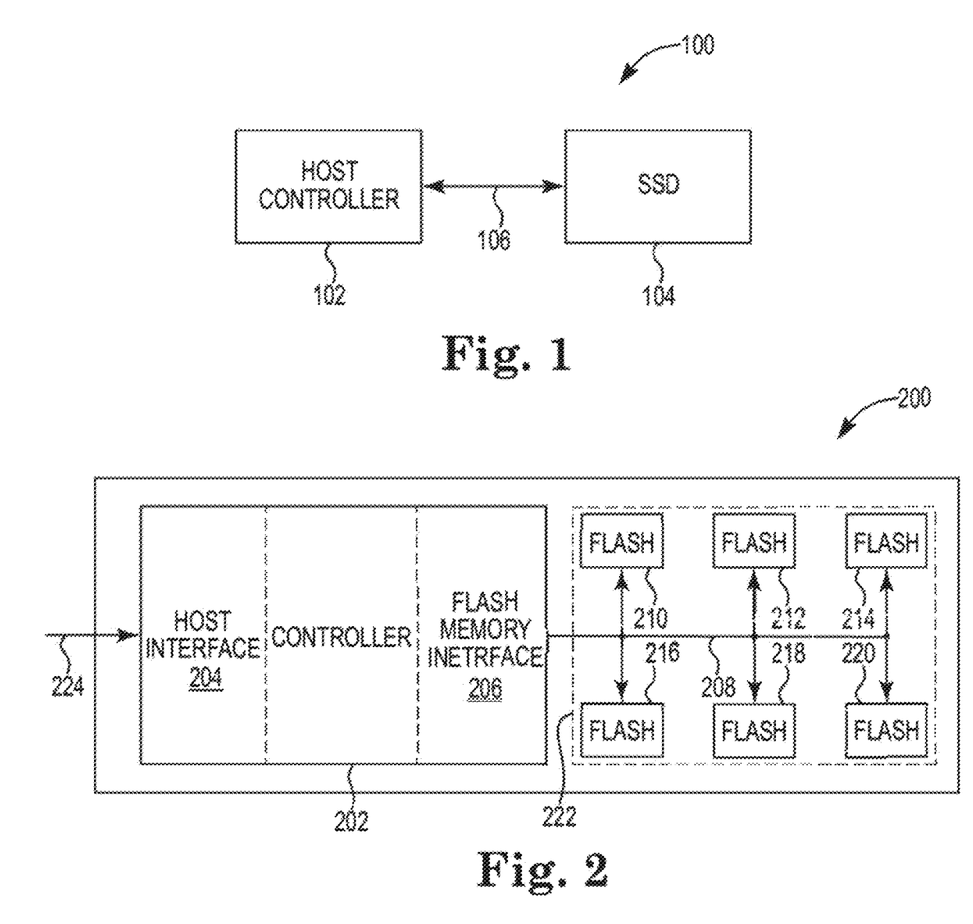
FIG. 1 is a block diagram of an apparatus in accordance with an embodiment of the present disclosure.
FIG. 2 is a block diagram of an apparatus in accordance with an embodiment of the present disclosure.

FIG. 1 is a block diagram of an apparatus 100 in accordance with an embodiment of the present disclosure. The apparatus 100 may be any computing device that includes an SSD coupled to a host. For example, the apparatus 100 may be a computer, server, mobile device, laptop computer, wearable device, an internet of things device, and the like. The apparatus 100 includes a host controller 102 coupled to an SSD 104 via a bus 106. In some embodiments, the bus 106 may be a PCIe bus. The host controller 102 may provide command packets to the SSD 104 via the bus 106. In some embodiments, the command packets may conform to the NVMe protocol, e.g., take the form of an SQE, but the user defined areas of the command packets may include non-NVMe defined commands and information that provide the host controller 102 with more control than NVMe conventionally provides. The SSD 104 may interpret the command packets and perform the commands at the level of control specified in the command packets.

The host controller 102 may be a memory controller 102 configured to interface between one or more cores (not shown) of the apparatus 100 based on a protocol. In some embodiments, the host controller 102 may be operating under the NVMe protocol, which may provide numerous output and input submission queues. The host controller 102 may receive commands from the one or more cores and provide the commands to the SSD 104 in conformance with the NVMe-defined command packet, e.g., the SQE. The command packets may be provided to the SSD 104 over the bus 106. In embodiments where the bus 106 is a PCIe bus, the command packets may potentially be provided in a different order than they were received by the host controller 102.

The SSD 104 may include a controller and a plurality of NAND flash memories coupled to the controller via one or more channels. In some embodiments, each flash memory may be coupled to the controller by a single channel. In some embodiments, each flash memory may be coupled to the controller by a plurality of channels. In some embodiments, the controller may include a frontend interface coupled to the bus 106 and a backend interface coupled to the plurality of flash memories via the channels. The frontend interface may be configured to receive the command packets based on the NVMe protocol, while the backend interface may be configured to communicate with the plurality of flash memories based on the ONFI protocol. The SSD 104 may receive command packets, e.g., NVMe-based command packets, from the host controller 102 and may provide non-NVMe-based commands to one or more of the plurality of flash memories included therein. Upon completion of the commands, the SSD 104 may provide, depending on command type, read data and/or command completion notifications.

The NVMe-based command packets may be formed from 16 DWords, as noted above, with some of the DWords available for user-defined entries. The packet may be assembled by the host controller 102, and may include user-defined entries that allow the host controller 102 to execute a higher level of control over one or more flash memories using the ONFI protocol and/or using user-defined commands. The user available DWords of the command packet may be structured to include identifiers, data, and commands in associated bytes that may be interpreted by the SSD 104 as non-NVMe entries. These identifiers, data, and commands may inform the SSD 104 how to link a sequence of commands and what physical address space of a targeted flash memory to access In performance, the host controller 102, based on instructions provided by one or more cores, may provide one or more command packets based on the above format to the SSD 104. The SSD 104 may analyze the received command packets and determine whether they are chained, and, if so, wait until all of the chained command packets have been received before providing commands to the flash memories. Once all of the chained command packets have been received, the SSD 104 may place them in the intended order based on the CCIDX byte. After the chained command packets have been assembled in order, the SSD 104 may provide the ONFI and non-ONFI commands and/or data to a designated flash memory and channel based on the chained command packets.

FIG. 2 is a block diagram of an apparatus 200 in accordance with an embodiment of the present disclosure. The apparatus 200, for example, may be a solid state drive (SSD) in some embodiments. The apparatus 200 may include a controller 202 and a plurality of flash memories 222. The plurality of flash memories may include flash memories 210-220, but the number of flash memories is a non-limiting aspect of the present disclosure. The controller 202 may be coupled to the plurality of flash memories 222 via a plurality of channels 208. In some embodiments, each of the plurality of flash memories 222 may be coupled to the controller 202 via a single channel. In some embodiments, each of the plurality of flash memories 222 may be coupled to the controller 202 via multiple channels. In some embodiments, a channel may include a plurality of flash memories. The controller may communicate with a host (not shown) over a bus 224, which in some embodiments is a PCIe bus. The apparatus 200 may receive one or more command packets, as defined above with regards to FIG. 1, from the host and perform one or more commands based thereon. In some embodiments, multiple received command packets may be chained together to form a single command executable by the apparatus 200. In some embodiments, the command packets may conform to the NVMe protocol but include non-NVMe specific commands. The received command packets may include a number of DWords that include user-defined and/or ONFI commands that may be performed at a level of control not conventionally provided by the NVMe protocol.

The controller 202 may control the operation of various functions of the apparatus 200. The controller 202, either with our without prompting from an external stimulus, may execute various functions, such as error correction, wear leveling of the plurality of flash memories 222, defect management, input/output control, and encryption/decryption operations, to name a few. The controller 202 may perform one or more of these functions based on internally generated commands, which may be based on measured characteristics of one or more of the plurality of flash memories 222. In some embodiments, one or more of these functions may be performed responsive to a command received from a host (not shown). The controller 202 may further be configured to control the interaction between a host interface 204 and the flash memory interface 206.

The host interface 202 may be configured for operating under the NVMe protocol and may receive command packets via the bus 224, and provide responses via the bus 224. The host interface 224 may provide the command packets, in whole or in part, to the flash memory interface 206. The flash memory interface 206 may interpret the command packets and provide control signals, address and/or data information to a target flash memory via a specified channel based on the command packets. The flash memory interface 205 may be configured to operate under the ONFI protocol, and, as such, may be able to interpret the user-defined DWords that include the ONFI-based commands. Additionally, the flash memory interface 206 may be able, based on hardware and/or firmware, be able to interpret any non-ONFI commands provided in the user-defined DWords of the command packets. The flash memory interface may receive data and/or completion notifications from the target flash memory and provide the same to the host interface 204, which may then be provided to the host.

The command packets may be formed from 16 DWords, as noted above, with some of the DWords available for user-defined entries. Table 1 depicts a command packet in accordance with an embodiment of the present disclosure. The first twelve DWords (DWords 0-11) of the command packet may be determined by the NVMe protocol, while the contents of the last four DWords (DWords 12-15) of the command packet may be determined by the host controller 102. The command packet may be assembled by a host (not shown), and may include user-defined entries in the user available DWords. The user available DWords of the command packet may be structured to include identifiers, data, and commands in associated bytes that may be interpreted by the controller 202 as non-NVMe entries. These identifiers, data, and commands may inform the controller 202 how to link a sequence of commands and what physical address space of a targeted flash memory to access. For example, DWord 12 may be used to define specific channels, memories (e.g., flash memories), and link a number of command packets, while DWords 13-15 may be used to control the operation of the targeted memory. In some embodiments, the host interface 204 may interpret linked command packets and provide the linked command packets to the flash memory interface 206 in a reconstructed format so that the flash memory interface 206 may perform the linked command packets as a single command, or a sequence of commands that do not require a completion notification to occur until the entire sequence is performed.

TABLE 1

| DWord | Byte | | | |
|---|---|---|---|---|
| | 3 | 2 | 1 | 0 |
| 15 | CTRL C | DQ 8 | DQ 7 | DQ 6 |
| 14 | CTRL B | DQ 5 | DQ 4 | DQ 3 |
| 13 | CTRL A | DQ 2 | DQ 1 | DQ 0 |
| 12 | CE | Chan | CCID | CCID |
| 11 | | NMT | | |
| 10 | | ND | | |
| 9-8 | | PRP Entry | | |
| 7-6 | | PRP Entry | | |
| 5-4 | | MPT | | |
| 3-2 | | Rsvd | | |
| 1 | | NSI | | |
| 0 | CID | | Rsvd | Opcode |

Figure 5:
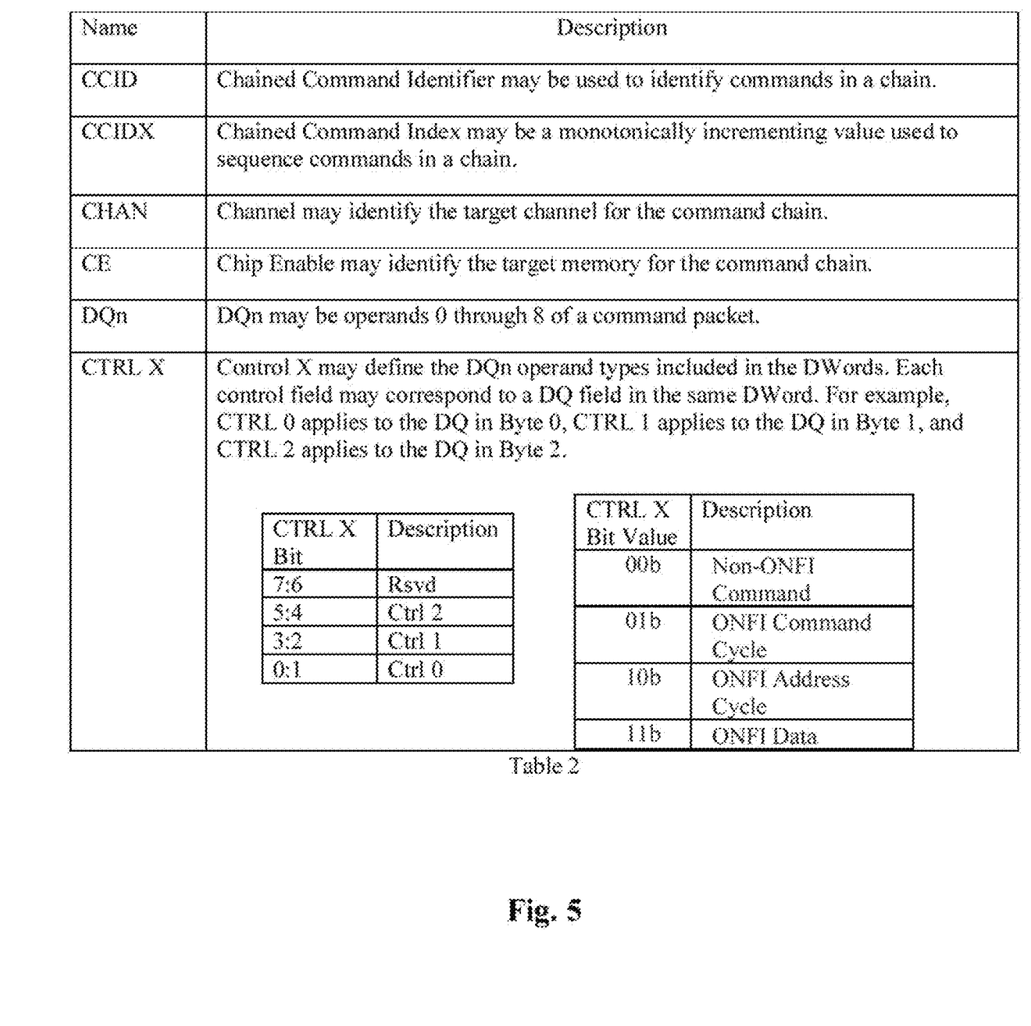
FIG. 5 illustrates Table 2, which shows the definitions of the entries in accordance with an embodiment of the present disclosure.

DWord 0 may include an NVMe-directed command identifier CID and a NVMe-based operation code Opcode. Dwords 1-11 are NVMe specific and will not be defined herein. Dwords 12-15 may include the host-defined entries and may be defined as follows. The provided definitions and designation of DWords 12-15 are intended as examples and the shown order and placement of commands is a non-limiting aspect of the present disclosure. The definitions of the entries associated with each byte of DWords 12-15 are shown in Table 2 of FIG. 5.

The CHAN entry may designate a channel within the apparatus 200 to access and the CE entry may designate a specific memory, e.g., flash memory, to access. The CCID entry may designate whether a command packet is part of a chain of command packets, and the CCIDX entry may designate a location in the chain the command packet belongs. By designating both the CCID and CCIDX information, the controller 202 may be able to place the chained command packets into the intended order, even if received out of order. The controller 202 may then interpret the chained command packets as a single command, and perform the command accordingly. For example, multiple pages of a target flash memory, such as the flash memory 212, may be programmed without the need for receiving additional commands, and a single notification may be returned to the host.

The CCID byte may associate multiple command packets as a chained command packet when all of the chained command packets have the same entry for the CCID byte. The CCIDX byte may indicate a location in the chained command packet an individual command packet is to be located. The CCIDX byte may be a hexadecimal-based number, which may allow up to 127 command packets to be linked. The last bit of the CCIDX byte, bit 7 for example, may be used to indicate the last command packet in the chain. For example, when bit 7 of the CCIDX byte is set, e.g., a "1," the controller 202 may recognize that as the last command packet in the chain of command packets. If the controller 202 determines that there are packets missing in the chain, then it may wait until it has received each of the CCIDX numbered between 00 h and 8 Xh before assembling the chained command packet.

The Control X bytes may have specific bits associated with specific DQn (input/output) operands and further designate what type of command the DQn operands are providing. The two tables inset in the CTRL X row of Table 2 provide further details. The types of operands the CTRL X entries may designate include non-ONFI commands, ONFI command, ONFI address, and ONFI data. For example, bits 0 and 1 of the CTRL X byte may be associated with DQ0 of the same DWord. Further, the values in bits 0 and 1 may designate the type of command provided by the associated DQn. To continue the example, if bits 01 and one of the CTRL X entry are binary "11," then the DQ0 command may be ONFI data. Further examples will be discussed below with regards to FIGS. 3 and 4.

The non-ONFI commands may be user-defined commands. Table 3 provides some examples of user-defined commands, but the examples are non-limiting. In some embodiments, the user-defined commands may be defined by an original equipment manufacturer (OEM) that incorporates an SSD, such as the apparatus 200, into OEM devices. The user-defined commands may provide commands that are not provided in either the NVMe protocol or the ONFI protocol, and may be commands an OEM may desire in order to have granular control of SSDs and/or for testing/troubleshooting SSDs.

TABLE 3

| Value | Command | Description of Non-ONFI Command |
|---|---|---|
| 00 h | NOP | Null Operation |
| 01 h | Wait Ready | Wait for Ready Status |
| 02 h | Measure tRDY | Measure the elapsed time from the last cycle to the Ready Bit is set |
| 03 h | Wait tADL | Wait for tADL |
| ... | ... | ... |
| 10 h | Delay ns | Inject a delay in nanoseconds |
| 11 h | Delay us | Inject a delay in microseconds |
| 12 h | Delay ms | Inject a delay in milliseconds |
| ... | ... | ... |
| 20 h | WP Assert | Assert Write Protect Signal |
| 21 h | WP De-assert | De-assert Write Protect Signal |
| ... | ... | ... |
| FFh | tbd | tbd |

The Wait Ready command may cause the flash memory interface 206 to poll a target flash memory of the plurality of flash memories 222 to determine when it is ready. The Measure tRDY may measure the time a flash device of the plurality of flash memories 222 takes to complete a command and provide the ready bit. The Wait tADL may cause a delay before an address latch is asserted. The delay commands may allow the SSD 104 to maintain control over a channel while waiting the designated delay time before providing additional control signals. The WP Assert/De-assert commands may allow direct control of writing to a target flash device. These commands may be handled in hardware and/or firmware of an SSD, such as the SSD 104, so that the SSD performs the intended non-ONFI command. In General, the user-defined of Table 3 may be performed by the flash memory interface 206.

As discussed, multiple command packets may be linked to form a chained command packet. In some embodiments, these chained command packets may be performed as a single command before providing data and/or completion notifications to a host. The chained command packets may be associated by a chained command identifier CCID and sequentially numbered by a chained command index CCIDX. In some embodiments, the chained command packets may be received out of order, which the controller 202 may rearrange into the correct order before the command is performed. In some embodiments, the user-defined DWords may provide low level control of one or more of the plurality of channels 208, one or more of the plurality of flash memories 222, and panes, pages, and physical addresses of one or more of the flash memories 222. This added flexibility and control provided by the command packet structure may allow the host to manipulate the apparatus 200 at levels that the NVMe protocol may not allow.

The plurality of channels 208 may include various bus configurations, and any and all channel configurations are contemplated by the present disclosure. For example, each of the plurality of flash memories 222 may be coupled to a single channel or multiple channels. Another way to characterize the channels is that each channel may include one or more of the plurality of flash memories 222. The plurality of channels may provide communication paths between the flash memory interface 206 and each of the plurality of flash memories 222. For example, based on one or more command packets, the flash memory interface 206 may provide address and/or data information along with control signals to a target flash memory, flash memory 210 for example, via one or more of the plurality of channels 208. In some embodiments, the flash memory interface 206 may maintain control of the one or more of the plurality of channels 208 while interfacing with the targeted flash memory.

Each of the plurality of flash memories 222 may be NAND flash in some embodiments as known in the art. Each of the plurality of flash memories 222 may receive address and/or data information at input/output circuits and one or more control signals at a control circuit. Based on the address/data information and the control signals, the flash memory may perform the command and provide a desired output, such as read data and/or a completion notification. Additionally, each of the plurality of flash memories may include multiple pages and planes that may be read from or written to simultaneously or sequentially.

Figure 3A:
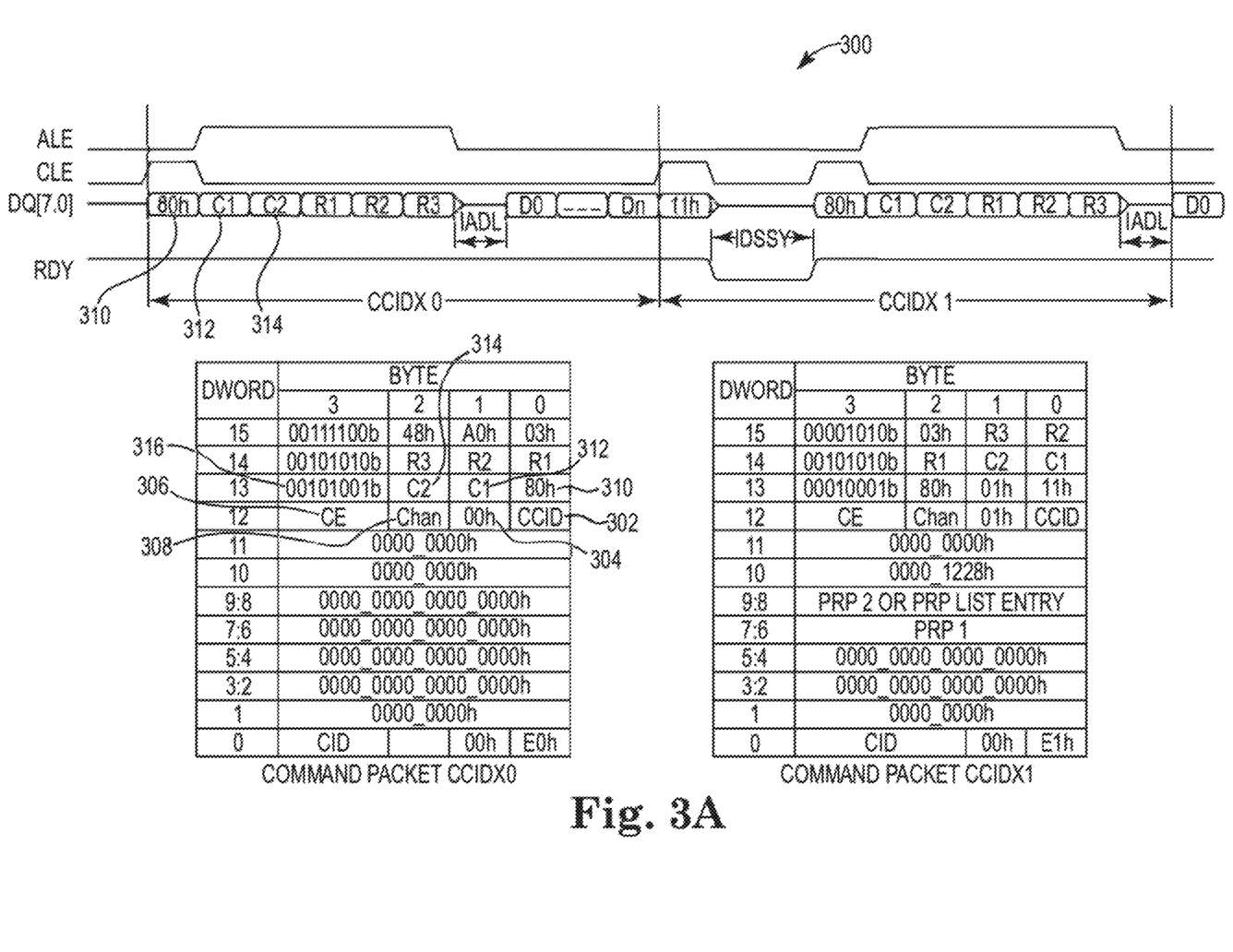
FIGS. 3A-3C are an example timing diagram and associated command packets in accordance with an embodiment of the present disclosure.
Figure 3B:
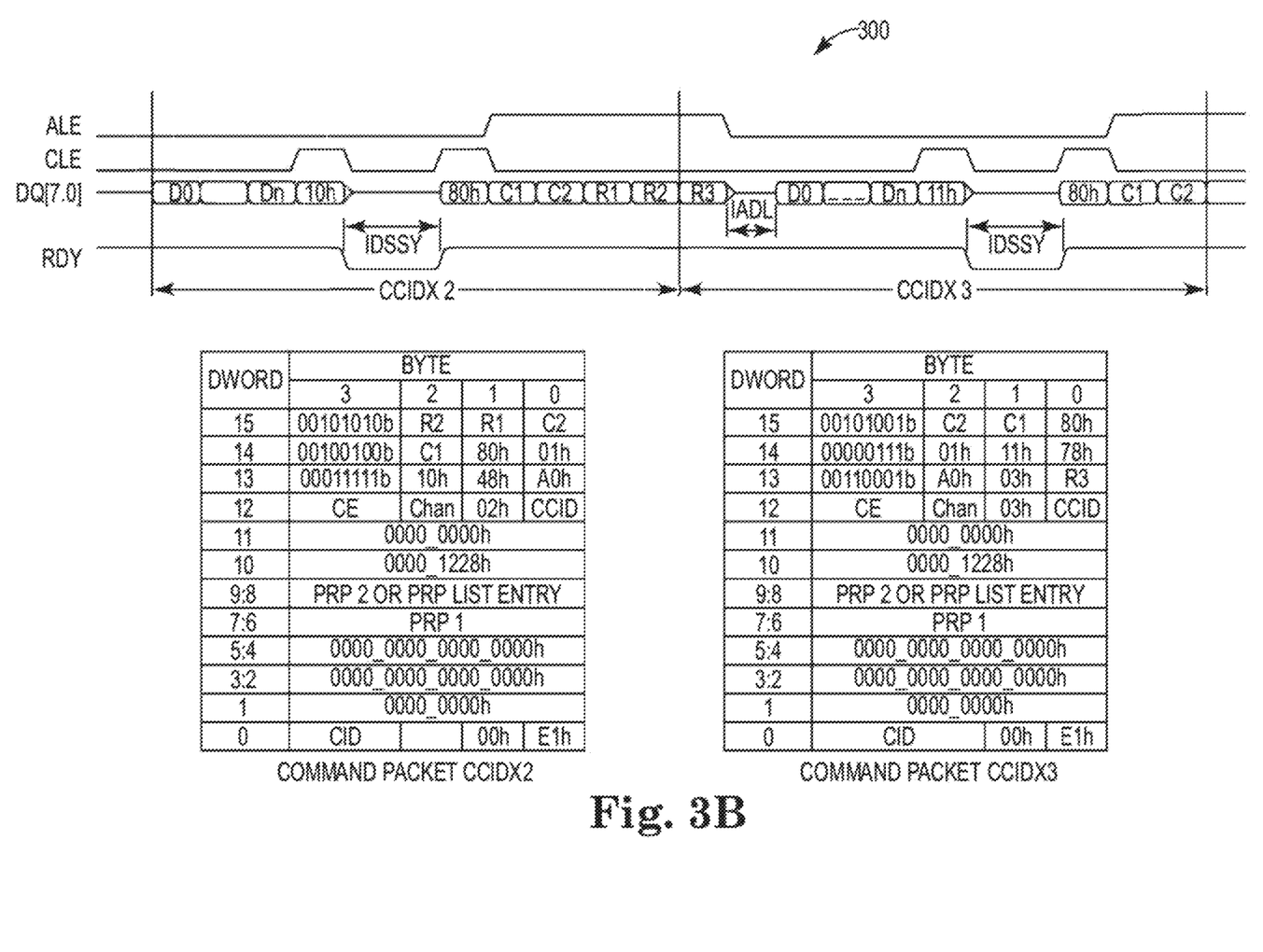
Figure 3C:
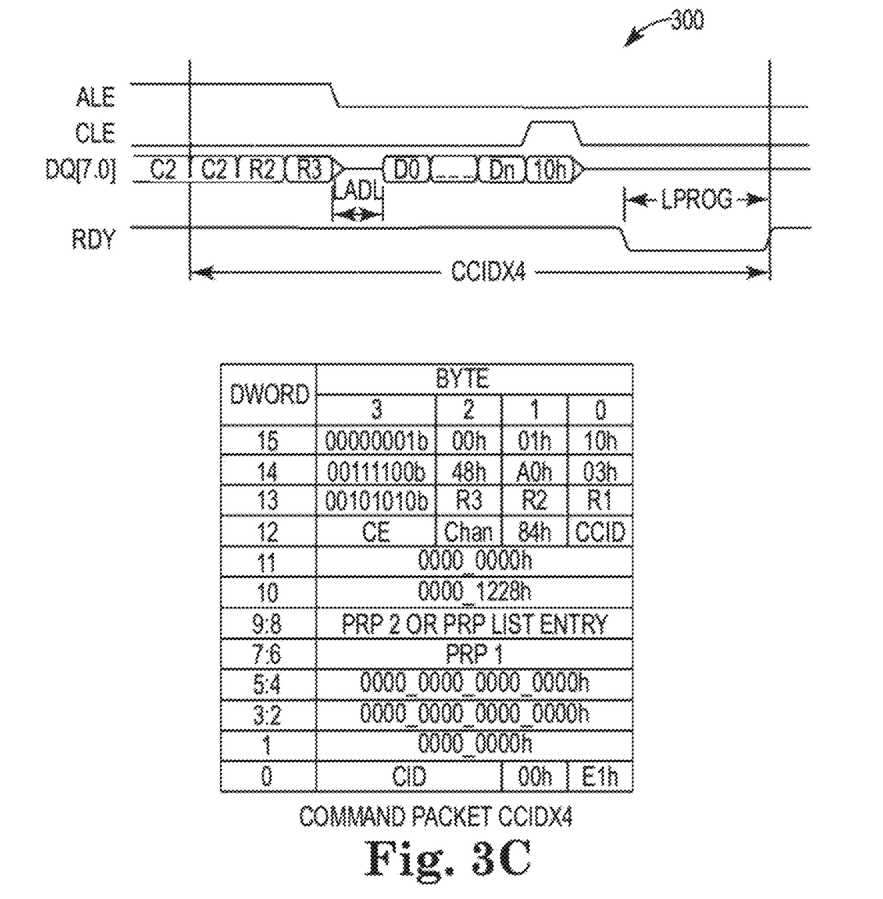

FIGS. 3A-3C are an example timing diagram 300 and associated command packets in accordance with an embodiment of the present disclosure. The timing diagram 300 may depict the sequence of data and/or address information and control signals a host controller, such as the host controller 202 by way of the flash memory interface 206 of FIG. 2, provides to a target flash memory via a target channel. FIGS. 3A-3C further include the command packet associated with each section of the timing diagram 300 for ease of discussion. The chained command sequence as illustrated in FIGS. 3A-3C may result in multiple pages of multiple planes of a single flash memory being programmed at once with the target flash memory device providing a single completion notification.

In some embodiments, the address and data information and control signals depicted in the timing diagram 300 may be provided by a flash memory interface, such as the flash memory interface 206, to a target flash memory via a target channel. The timing diagram 300 shows user-defined DWord entries of five chained command packets, which are shown in the tables shown in FIGS. 3A-3C. Each of the timing diagram 300 sections are designated with their own CCIDX number, 0 through 4 for example, and all have the same CCID number, which is shown in the respective command packets CCIDX0-4.

Additionally, each section of the timing diagram 300 is directed toward the same flash memory device and channel. An SSD, such as the apparatus 200 of FIG. 2, may receive multiple command packets chained together, e.g., linked, with each command packet in the chain at least designating an identical channel, and an identical flash memory. The multiple command packets may be sequentially numbered so that a desired order is indicated. If the command packets are received out of order, the SSD may wait until all of the command packets are received and assemble them as intended before performing the command, or commands, provided by the command packets.

For ease of discussion, the user-defined DWords of command packets shown in FIGS. 3A-3C will be discussed with respect to the timing diagram 300. The DWords 0-12, which may be conventional NVMe constructs, will not be discussed. Byte 0 of DWord 0 includes an NVMe opcode, such as 00 h and 01 h, which may denote commands without and with data, respectively. Commands with data may have data transferred from host memory to the target flash memory of an SSD, for example. The DWords 12-15 and their respective bytes will be discussed in more detail below, which includes Chip Enable CE, channel CHAN, chained command index CCIDX, chained command identifier CCID, operands DQn, and control x CTRLX, which may define the type of operands of associated DQns.

As discussed above, pairs of bits of byte 3 of DWords 13-15 may be associated with and define a command type of bytes 0-2 of respective DWords. Table 1 and 2 above provide further definitions and associations. For example, byte 3 of DWord 13, labled 316 in command packet CCIDX0 of FIG. 3A, defines the values in bytes 0 through 3 of DWord 13, which are labeled 310, 312, and 314, respectively. Reference to Table 3 may also be made when a non-ONFI command is called out in one of the DQn bytes.

The value in byte 0 of DWord 12, labeled 302 in command packet CCIDX0 of FIG. 3A, may indicate the chained command identifier, which links together multiple command packets. For example, the value in byte 0 of DWord 12 of command packet CCIDX 0 is CCID. The command packets CCIDX1-4 also have CCID in byte 0 of DWord 12, which indicates they are linked together. The value in byte 1 of DWord 12, labeled 304 in command packet CCIDX0 of FIG. 3A, may identify the chained command index number, which identifies the location in the chain each command packet is to be placed. For example, the value in byte 1 of DWord 12 of command packet CCIDX0 is the hexadecimal value "00," which indicates the first command packet in the chained command packet identified as CCID. Similarly, byte 1 of DWord 12 of each command packet CCIDX1-CCIDX4 indicates the respective CCIDX number. An SSD controller, such as the controller 202 of FIG. 2, may utilize the chained command index number, e.g., the CCIDX number, to determine the order the chained commands should be placed. For example, the timing diagram show the order the command packets CCIDX0-4 are placed in prior to the control signals, command and address signals are provided to the target memory device via the target channel.

Bytes 2 and 3 of DWord 12, labeled 308 and 306, respectively, in command packet CCIDX0 of FIG. 3A, may designate the target flash memory, value labeled 306, and target channel, value labeled 308, the controller is to provide with the commands, addresses, and data designated in DWords 13-15. The host controller may provide control signals, such as address latch enable ALE, and command latch enable CLE to the target flash memory on the target channel. The ALE and CLE signals, also labeled 316 in FIG. 3A to show their relationship to the control X information, are shown in the timing diagram 300 and are provided as is known in the art. The assertion of the ALE and CLE control signals may be based on the information provided in byte 3 of DWords 13-15. Because byte 3 includes the control X information, e.g., designates a command type for an associated DQn, the command type, e.g. command, data, address, may determine what control signal is provided when. Accordingly, the timing diagram 300 depicts the contents of bytes 0-2 of DWords 13-15 being provided to the target flash memory while their respective control signals are asserted.

With regards to command packet CCIDX0, and the associated section CCIDX0 of the timing diagram 300, CTRL0 of DWord 13 designates byte 0 of DWord 13 as an ONFI command cycle. CTRL0 is bits [1:0] of the binary code labeled 316 in FIG. 3A, see Table 2 shown in FIG. 5. As such, the "80" in hexadecimal shown in byte 0 of DWord 13, labeled 310 in FIG. 3A, corresponds to an ONFI command, a write command for example. The "80" is initially provided to inputs DQ[7:0] as shown in the timing diagram 300, and labeled with a corresponding 310, while the CLE signal is asserted.

Referring back to command packet CCIDX0, and the associated section CCIDX0 of the timing diagram 300, CTRL1 of DWord 13 designates byte 1 of DWord 13 as an ONFI address cycle. CTRL1 is bits [3:2] of the binary code labeled 316 in FIG. 3A, see Table 2 shown in FIG. 5. As such, the "C1" shown in byte 1 of DWord 13, labeled 312 in FIG. 3A, corresponds to an ONFI address, a column designation for example. The "C1" is provided to inputs DQ [7:0] as shown in the timing diagram 300, and labeled with a corresponding 312, while the ALE signal is asserted.

Referring back to command packet CCIDX0, and the associated section CCIDX0 of the timing diagram 300, CTRL2 of DWord 13 designates byte 2 of DWord 13 as another ONFI address cycle. CTRL2 is bits [5:4] of the binary code labeled 316 in FIG. 3A, see Table 2 shown in FIG. 5. As such, the "C2" shown in byte 2 of DWord 13, labeled 314 in FIG. 3A, corresponds to an ONFI address, a column designation for example. The "C2" is provided to inputs DQ [7:0] as shown in the timing diagram 300, and labeled with a corresponding 314, while the ALE signal is continued to be asserted.

Referring back to command packet CCIDX0, bytes 0-2 of DWord 14, which show R1, R2 and R3, respectively, are provided on inputs DQ [7:0] while the ALE signal is continued to be asserted. These values are address information, e.g., column and row address information, as determined by their respective CTRLX values of "10," which indicates an ONFI address cycle, as shown in respective bits of byte 3 of DWord 14. After the R3 value is provided to the inputs, the timing diagram 300 shows a wait time tADL. The wait time tADL is inserted due to the hexadecimal value of "03" in byte 0 of DWord 15, based on the associated CTRL0 value of "00" In byte 3 of DWord 15. The CTRL0 value of "00" designates a non-ONFI command, per Table 2. Bytes 1 and 2 of DWord 15 are provided next, which have associated CTRLX values of "11" designating their values as ONFI data. The data associated with bytes 1 and 2 of DWord 15 are shown simply as D0———Dn in the CCIDX0 section of the timing diagram 300. The CCIDX0 section of the timing diagram 300 may end after data Dn, as indicated in timing diagram 300.

The analysis and correspondence between the values in the command packet CCIDX1 and the associated CCIDX1 section of the timing diagram 300 follow a similar analysis as above, but some of the detail may be omitted for brevity. With regards to command packet CCIDX1 and the associated CCIDX1 section of the timing diagram 300, byte 0 of DWord 12, which includes the hexadecimal value of "11" is provided on the input pins DQ [7:0]. Based on the associated CTRL value of "01," the value of "11" in byte 0 of DWord 12 corresponds to an ONFI command informing the target flash memory that the transfer of data is complete. Per the timing diagram, the hexadecimal value of "11" is followed by a tDBSY signal asserted on the RDY line. The tDBSY signal may be provided by the target flash memory during programming the data provided. The tDBSY signal is followed by the sequence of "80" in hexadecimal, C1, C2, R1, R2, and R3. Similar to the command packet 0, this sequence provides an ONFI command followed by address information. The command packet 1 ends with the assertion of tADL due to the hexadecimal value of "03" included in byte 2 of DWord 15. The section CCIDX1 of the timing diagram ends with tADL.

As can be seen by the timing diagram 300, each section of the timing diagram associated with a command packet begins with byte0 of DWord 12 and ends with byte 2 of DWord 15. Depending on the type of entry, e.g., command, address, or data, in bytes 0-2 of DWords 13-15, the flash memory interface, such as the flash memory interface 206 of FIG. 2, may provide the data, command, or address information to the target flash memory or assert a wait time into the timing diagram, such as a tADL, tDBSY, or tPBSY, to name a few examples.

With regards to command packet CCIDX2 and the associated CCIDX2 section of the timing diagram 300, the ONFI data of hexadecimal values "A0" and "48" are first provided on the input pins DQ [7:0] before the ONFI command "10" in hexadecimal is provided. The data and ONFI command correspond to bytes 0 through 3 of DWord 12. Byte 0 of DWord 12 includes the hexadecimal value of "01" and has an associated CTRL0 value of "00." which may be a non-ONFI command. Based on Table 3, the non-ONFI command of "01" may correspond to a command of wait for ready status, and may result in the RDY signal being asserted low. This command, for example, may cause the flash memory interface to wait for a ready signal before providing additional data and/or control signals. Once the RDY signal is de-asserted, the remaining bytes of the command packet 2 may be provided, such as the ONFI command "80" and the address information C1, C2. R1, and R2. The CCIDX2 section of the timing diagram 300 may end after the address information R2 is provided.

With regards to command packet CCIDX3 and the CCIDX3 section of the timing diagram 300, the ONFI address information R3 may be provided first before the wait time tADL occurs. After the wait time tADL, the ONFI data "A0" and "78" (in hexadecimal) is provided prior to the transfer complete ONFI command ("11" in hexadecimal) is provided. Another tDBSY wait time occurs, based on the hexadecimal value of "01" in byte 2 of DWord 14, prior to providing the ONFI write command in byte 0 of DWord 15, e.g., the hexadecimal value of "80." The CCIDX3 section of the timing diagram 300 ends with providing ONFI address information C1 and C2 on the inputs DQ [7:0].

With regards to command packet CCIDX4 and the associated CCIDX4 section of the timing diagram 300, the ONFI address information R1, R2, and R3 are initially provided by the flash memory interface. It should be noted that command packet 4 may be the last packet in the chained command packets based on the hexadecimal value of "84" included in byte 1 of DWord 12. By setting bit 7 of this byte, the SSD may be informed that this is the last command packet in the chained command packet, and the command packets 0 through 3 may be needed to assemble a command to perform. Similar to the other four command packets, the command packet 4 includes a wait time tADL followed by the transfer of ONFI data, hexadecimal values of "A0" and "48," and a transfer complete command. The command packet 4 ends with a no operation command based on the CTRL2 value of "00" and the byte 2 hexadecimal value of "00," both of DWord 15. A tPROG signal may then be asserted by the target memory device on the RDY line to inform the flash memory interface that the write command is complete. As noted above, the write command included simultaneously writing data to two pages of two planes.

Figure 4:
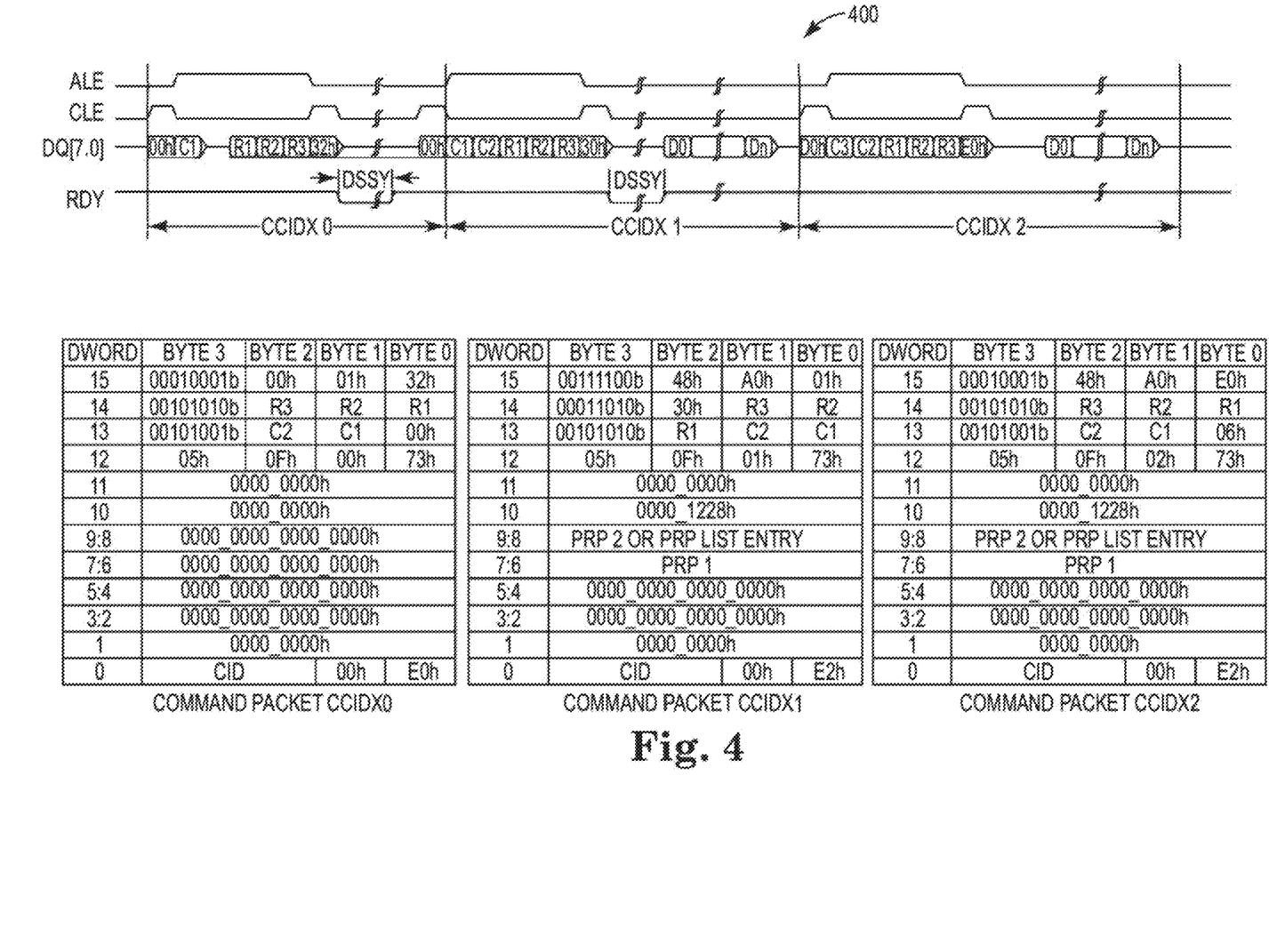
FIG. 4 is an example timing diagram and associated command packets in accordance with an embodiment of the present disclosure.

FIG. 4 is an example timing diagram 400 and associated command packets in accordance with an embodiment of the present disclosure. The timing diagram 400 may depict a multi-plane read page command chained with a read page and a change column command. The chained command may include three command packets, such as command packets 0, 1, and 2. The discussion of FIG. 4 may be similar to the discussion of FIGS. 3A-3C, and, as such, only the DWords shown on the timing diagram will be discussed.

In general, the chained command packet of FIG. 4 may be targeting a flash memory associated with the hexadecimal value of "05" associated with byte 3 of DWord 12. e.g., chip enable CE. Based on byte 2 of DWord 12, the channel CHAN associated with hexadecimal value "0F" is the channel being targeted. The chained command identifier CCID of hexadecimal value "73" in byte 0 of DWord 12may indicate that all of the command packets are associated, and the chained command index CCIDX value in byte 1 of DWord 12 may indicate order of the chained command packets. These same values, except for the changing CCIDX value, may be included in all of the command packets shown in FIG. 4.

With regards to packet 0 and the CCIDX0 section of the timing diagram 400, byte 0 of DWord 13 may indicate a non-ONFI command of "00" hexadecimal is to be performed. e.g., a no operation. The CLE is asserted high during the transmission of the non-ONFI command. The non-ONFI command is followed by ONFI address information C1, C2, R1. R2, and R3. The ALE signal is asserted high during the transmission of the ONFI address information. After the address information is provided to the target flash memory, the ONFI command defined by the hexadecimal value "32" is provided, which is followed by a wait time tDBSY. The wait time tDBSY may be performed due to the hexadecimal value of "01" in byte 1 of DWord 15. The ONFI command defined by the hexadecimal value "00" may be provided after the wait time tDBSY. The CCIDX0 section of the timing diagram 400 may then end.

With regards to packet 1 and the CCIDX1 section of the timing diagram 400, ONFI address information C1, C2, R1, R2, and R3 may be provided first. The ONFI address information may be followed by the ONFI command designated by the hexadecimal value of "30." The wait time tR may follow the ONFI command, which may be a non-ONFI command based on byte 0 of DWord 15. The ONFI data based on bytes 1 and 2 of DWord 15 may then follow the wait time tR. The ONFI data may be provided by the target flash memory to the flash memory interface in the example of FIG. 4.

With regards to packet 2 and the CCIDX2 section of the timing diagram 400, the CCIDX2 section begins with an ONFI command based on the hexadecimal value in byte 0 of DWord 13, which is the hexadecimal value "06." ONFI address information C1, C2, R1, R2, and R3 is provided next based on bytes 1 and 2 of DWord 13 and bytes 0-2 of DWord 14. The address information is followed by the ONFI command designated by the hexadecimal value of "E0," which is followed by ONFI data of hexadecimal values "A0" and "48." The ONFI data may be provided by the target flash memory to the flash memory interface in the example of FIG. 4. The chained command packets of FIG. 4 may result in two instances of read data provided by the target flash memory in response to the chained command packets.

It should be appreciated, based on the examples provided in FIGS. 3 and 4, that the user-defined DWords do not need to form to any specific sequence within a command packet except for maybe the CE, CHAN. CCIDX, and CCID fields. The DQn fields may be different from command packet to command packet, for example. This flexibility of what is included in the DQn fields of the command packets may be due to the ability of the SSD controller, such as the controller 202 of FIG. 2, to reassemble chained command packets. Additionally, it should be appreciated that the ability to chain command packets may allow a host to request and the SSD to perform commands that may not conventionally fit inside the user-defined DWords of a conventional NVMe SQE. Lastly, by accessing ONFI control through the NVMe SQE packet structure, a host may be able to assert low level control on targeted flash memories of targeted channels that the conventional NVMe SQE does not provide. Stated another way, the command packets disclosed herein provide a means of tunneling into ONFI control, and also user-defined non-ONFI commands, through the NVMe SQE packet structure.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus comprising:
a plurality of flash memories;
a memory controller configured to receive, from a host controller, a plurality of packets and interpret each of the plurality of packets based on a first protocol, wherein the first protocol defines a first portion of each packet as protocol defined and a second portion of each packet as user-defined, wherein the memory controller is further configured to access one or more of the plurality of flash memories based on the user-defined portion of the plurality of packets, and wherein the user-defined portion of the plurality of packets is interpreted based on a second protocol different than the first protocol, and wherein the protocol defined portion includes a first command according to the first protocol and the user-defined portion includes a second command according to the second protocol, a control operand, and an I/O operand, wherein the control operand designates a type of command provided by the I/O operand.

2. The apparatus of claim 1, wherein the first protocol is a Non-Volatile Memory Express (NVMe) protocol, and the second protocol is an Open NAND Flash Interface (ONFI) protocol.

3. The apparatus of claim 1, wherein the user-defined portion further includes a link identifier, and wherein the memory controller is configured to determine if any of the plurality of packets are linked based on the link identifier.

4. The apparatus of claim 3, wherein the user-defined portion further includes an index, and wherein the memory controller is configured to arrange the linked ones of the plurality of packets based on the index.

5. The apparatus of claim 1, wherein first protocol defines a plurality of DWords in each packet, and wherein a first portion of the plurality of DWords are protocol defined and a second portion are user-defined.

6. The apparatus of claim 1, wherein the memory controller is configured to identify a target one of the plurality of flash memories and a target channel based on identifiers in the user-defined portion of the plurality of packets.

7. The apparatus of claim 1, wherein the memory controller is configured to provide data, address, and control signals to the target flash memory based on interpreting the user-defined portion of the plurality of packets with the second protocol.

8. A method comprising:
receiving a plurality of packets at a memory controller from a host controller;
interpreting each of the plurality of packets based on a first protocol, wherein the first protocol defines a first portion of each packet as protocol-defined and defines a second portion of each packet as user-defined;
interpreting the user-defined portion of the plurality of packets based on a second protocol different than the first protocol, wherein the protocol-defined portion includes a first command according to the first protocol and the user-defined portion includes a second command according to the second protocol, a control operand, and an I/O operand, wherein the control operand designates a type of command provided by the I/O operand; and
accessing one or more of a plurality of flash memories based on the interpreted user-defined portion of the plurality of packets.

9. The method of claim 8, further comprising accessing the one or more of the plurality of flash memories based on physical address information in the user-defined portion.

10. The method of claim 8, further comprising linking a subset of the plurality of packets based on a link identifier in the user-defined portion of the subset of the plurality of packets.

11. The method of claim 10, further comprising:
determining if all of the subset of the plurality of packets have been received; and
waiting until all of the subset of the plurality of packets have been received before accessing the one or more of the plurality of flash memories based on one or more commands included in the user-defined portions of the subset of the plurality of packets.

12. The method of claim 10, further comprising ordering the subset of the plurality of packets based on an index in the user-defined portion of the subset of the plurality of packets.

13. The method of claim 8, further comprising accessing the one or more of the plurality of flash memories based on user-defined commands in the user-defined portion of the plurality of packets.

14. The method of claim 8, further comprising identifying a channel to access based on identifiers in the user-defined portion of the plurality of packets.

15. A method comprising:
receiving, using a first protocol, a plurality of packets at a front end of memory controller from a host controller, each of the plurality of packets including a plurality of DWords, wherein a first portion of the plurality of DWords are defined by the first protocol;
interpreting, with a back end interface of the memory controller, a second portion of the plurality of DWords based on a second protocol different than the first protocol, wherein the second portion are user-defined by the first protocol, and wherein the first portion includes a first command according to the first protocol and the second portion includes a second command according to the second protocol, a control operand, and an I/O operand, wherein the control operand designates a type of command provided by the I/O operand; and providing control signals and operands to a flash memory based on the interpreted second protocol.

16. The method of claim 15, further comprising linking at least some of the plurality of packets based on a link identifier in the second portion of the plurality of DWords.

17. The method of claim 16, further comprising ordering the at least some of the plurality of packets based on an index.

18. The method of claim 16, further comprising interpreting the linked at least some of the plurality of packets as a single command or a sequence of commands.

19. The method of claim 15, wherein the first protocol is a Non-Volatile Memory Express (NVMe) protocol, and the second protocol is an Open NAND Flash Interface (ONFI) protocol.

20. The method of claim 15, providing the control signals and operands along a target channel of a plurality of channels based on a channel identifier in the second portion of the plurality of DWords.

* * * * *